(12) United States Patent
Jung et al.

(10) Patent No.: US 8,224,301 B2
(45) Date of Patent: Jul. 17, 2012

(54) METHOD AND DEVICE FOR CONTROLLING TERMINAL BASED ON RECOGNITION OF VEHICLE DRIVING CONDITION

(75) Inventors: Ilgu Jung, Daejeon (KR); Byung Yun Lee, Daejeon (KR); Byung Sun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 97 days.

(21) Appl. No.: 12/829,631

(22) Filed: Jul. 2, 2010

(65) Prior Publication Data

US 2011/0143719 A1 Jun. 16, 2011

(30) Foreign Application Priority Data

Dec. 14, 2009 (KR) .................. 10-2009-0124147
Apr. 29, 2010 (KR) .................. 10-2010-0040151

(51) Int. Cl.
*G06F 15/16* (2006.01)

(52) U.S. Cl. .................................. 455/414.1; 455/414.2

(58) Field of Classification Search .................. 455/41.2, 455/410, 411, 414.1, 414.2
See application file for complete search history.

(56) References Cited

U.S. PATENT DOCUMENTS

2007/0082614 A1* 4/2007 Mock .......................... 455/41.2

FOREIGN PATENT DOCUMENTS

KR 1998-037885 B1 8/1998
KR 1020040094926 11/2004

* cited by examiner

*Primary Examiner* — Sam Bhattacharya
(74) *Attorney, Agent, or Firm* — Nelson Mullins Riley & Scarborough LLP; EuiHoon Lee, Esq.

(57) ABSTRACT

A communication server in cooperation with a telematics center receives a result message for condition guidance service selection result information from the telematics center to control a driver terminal according to traveling condition recognition of a vehicle, stores a driver terminal number, call control request information during traveling, and condition notice information during traveling included in the result message, sets a condition guidance service, and controls call connection with a call connection attempting terminal for attempting a call connection to the driver terminal according to a type of the result message.

15 Claims, 5 Drawing Sheets

METHOD AND DEVICE FOR CONTROLLING TERMINAL BASED ON RECOGNITION OF VEHICLE DRIVING CONDITION

CROSS-REFERENCE TO RELATED APPLICATION

This application claims priority to and the benefit of Korean Patent Applications No. 10-2009-0124147 filed in the Korean Intellectual Property Office on Dec. 14, 2009, and No. 10-2010-0040151 filed therein on Apr. 29, 2010, the entire contents of which are incorporated herein by reference.

BACKGROUND OF THE INVENTION (a) Field of the Invention

The present invention relates to a method and device for controlling a terminal based on recognition of a vehicle drive condition.

(b) Description of the Related Art

The telematics technique can provide various multimedia services to a driver by using vehicle information and a radio communication network, and can also provide active vehicle security and various intellectual services based on it.

The vehicle information is obtainable through an electronic control unit (ECU), it is collected and provided by a vehicle manufacturer through a specific interface so that a telematics module may use vehicle information, and its usage is gradually increasing. In addition, as the circulation of vehicles and the number of mobile phones have increased, the occurrence rate of traffic accidents caused by using a mobile phone during traveling has increased every year and so methods for reducing the rate have been demanded.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for controlling a driver's terminal according to a drive condition of a vehicle.

The present invention has been made in an effort to provide a method for reducing a risk rate of traffic accidents that may occur because of a call during traveling and a terminal control device to a vehicle driver.

An exemplary embodiment of the present invention provides a method for a terminal control device to control a terminal according to vehicle drive condition recognition, including: receiving vehicle speed information from an electronic control unit connected to the terminal control device; generating a vehicle traveling notice message based on the received vehicle speed information, and providing the same to the driver terminal; requesting a telematics center connected to the terminal control device to set a service; and outputting a notice message for notifying that a vehicle traveling condition recognition service is set to the driver terminal.

Another embodiment of the present invention provides a method for a communication server in cooperation with a telematics center to control a driver terminal according to traveling condition recognition by a vehicle, including: receiving a result message for condition guidance service selection result information from the telematics center; storing a driver terminal number, call control request information during traveling, and condition notice information during traveling included in the result message, and setting a condition guidance service for the driver terminal; and controlling call connection between a call connection attempting terminal for attempting call connection to the driver terminal according to the type of result message and the driver terminal.

Yet another embodiment of the present invention provides a device for controlling a terminal according to traveling condition recognition by a vehicle in cooperation with a telematics center and a communication server, including: an information receiver, provided in the vehicle, for receiving vehicle information from an electronic control unit for collecting the vehicle information; a terminal sensor for sensing whether the terminal is located in the vehicle and attempting access to the terminal when the information receiver receives the vehicle information; a message generator for generating a condition notice service request message and a traveling message by determining a traveling state of the vehicle based on traveling speed information of the vehicle included in the vehicle information, and generating a selection result message that is a result of the service request message; and a display for outputting the condition notice service request message and the traveling message generated by the message generator, or transmitting the selection result that is a response to the condition notice service request message to the message generator.

DETAILED DESCRIPTION OF THE EMBODIMENTS

Figure 1:
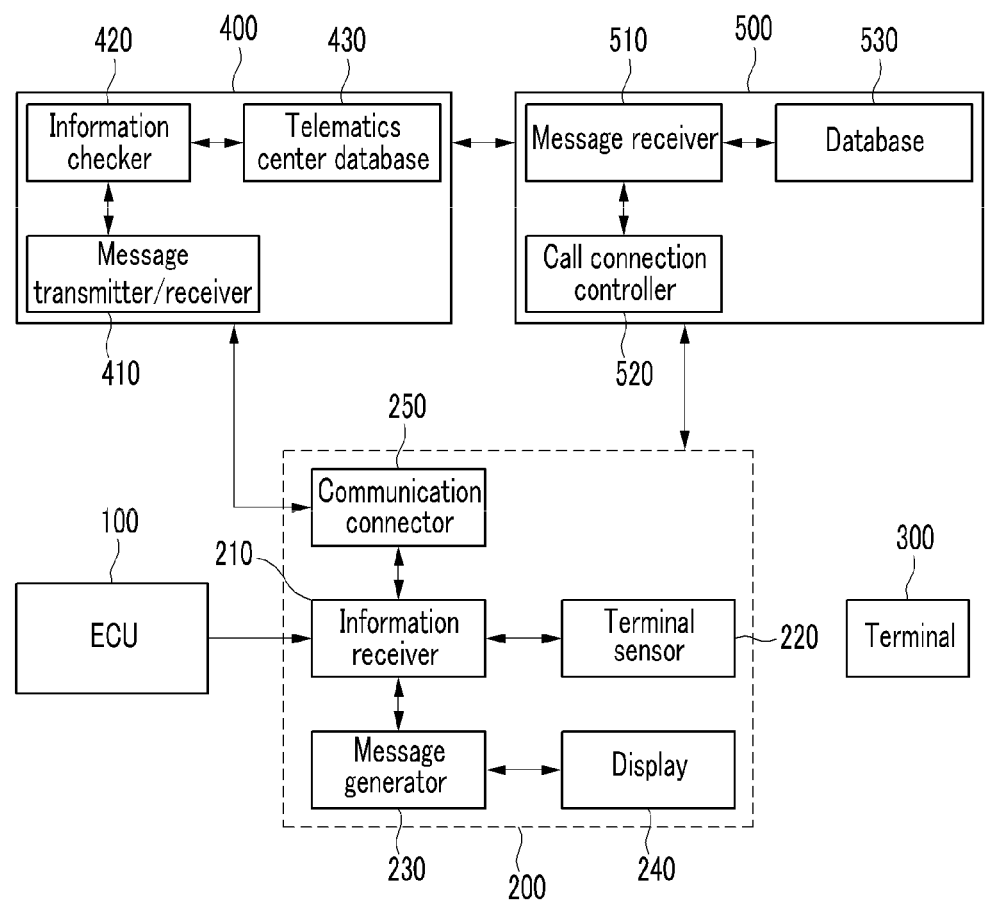
FIG. 1 shows an environment for providing a condition recognition service according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

In the specification, a terminal may indicate a mobile station (MS), a mobile terminal (MT), a subscriber station (SS), a portable subscriber station (PSS), user equipment (UE), and an access terminal (AT), and it may include entire or partial functions of the mobile station (MS), the mobile terminal, the subscriber station, the portable subscriber station, the user equipment, and the access terminal.

In the specification, a base station (BS) may indicate an access point (AP), a radio access station (RAS), a nodeB (Node-B), an evolved node-B (eNB), a base transceiver station (BTS), and a mobile multihop relay (MMR)-BS, and it may include entire or partial functions of the access point, the radio access station, the nodeB, the evolved node-B, the base transceiver station, and the mobile multihop relay-BS.

A method for reducing a rate of traffic accidents caused by usage of a terminal during traveling by using a telematics service and a mobile communication service according to an exemplary embodiment of the present invention will now be described with reference to accompanying drawings.

FIG. 1 shows an environment for providing a condition recognition service according to an exemplary embodiment of the present invention.

As shown in FIG. 1, to provide a service for recognizing a vehicle traveling condition, the environment includes a telematics module installed in a vehicle (a terminal control device hereinafter for convenience of description) 200 and a telematics center 400. The communication server 500 communicates with the terminal control device 200 and the telematics center 400.

The terminal control device 200 includes an information receiver 210, a terminal sensor 220, a message generator 230, a display 240, and a communication connector 250. The telematics center 400 includes a message transmitter/receiver 410, an information checker 420, and a telematics center database 430.

The communication server 500 includes a message receiver 510, a communication connection controller 520, and a database 530. In the exemplary embodiment of the present invention, the communication server 500 will be described to control call connection of a terminal in a vehicle, and a general mobile communication service provider's system is also usable.

The information receiver 210 of the terminal control device 200 receives vehicle information (e.g., vehicle speed information and vehicle starting state change information) from the electronic control unit (ECU) 100. To realize this, the information receiver 210 and the ECU 100 are connected through an interface provided by a vehicle manufacturer.

The terminal sensor 220 stores driver terminal information, and senses whether a driver has taken a terminal 300 in a vehicle when the information receiver 210 receives the vehicle's starting state change information from the ECU 100. In this instance, terminal information includes the terminal's owner and communication means.

The terminal sensor 220 determines connection to the terminal 300, and repeatedly connects to the terminal 300 until connected. In this instance, the terminal sensor 220 repeats re-connection to the terminal 300 a predetermined number of times, and finishes the connection attempt when the repetitions exceed the predetermined number of times. Here, the terminal sensor 220 senses whether the driver has the terminal 300 by using the same communication means as the terminal 300, the sensing method is well known to a skilled person, and the detailed description thereof will be omitted in the exemplary embodiment of the present invention.

When the information receiver 210 receives information that the vehicle runs faster than a predetermined speed, for example, 1 km/h, from the ECU 100, and the terminal sensor 220 senses the driver terminal 300, the message generator 230 recognizes it as the condition in which the driver rides in the vehicle with the terminal 300, and generates a message for asking whether to receive a condition notice service. The message generator 230 generates information to set a condition notice service according to corresponding information when receiving predetermined information from the user through the display 240.

The display 240 displays a text or voice traveling message to the driver to notify that the current vehicle is running. The display 240 displays a service usage message for asking whether to provide a condition notice service generated by the message generator 230 to the driver so that the driver may select whether to receive a condition notice service during traveling, and may select a submenu.

The communication connector 250 transmits/receives the message or information generated by the message generator 230 to/from the telematics center 400. A wireless communication module will be exemplified for the communication connector 250 in the exemplary embodiment of the present invention.

The message transmitter/receiver 410 of the telematics center 400 receives a selection result message from the terminal control device 200 or transmits the received selection result message to the communication server 500.

The information checker 420 extracts a service subscriber number included in the selection result message received by the message transmitter/receiver 410, and checks call control request information during traveling and condition notice information during traveling. Upon receiving a terminal number corresponding to the service subscriber number from the telematics center database 430, the information checker 420 changes the service subscriber number information of the selection result message transmitted by the message transmitter/receiver 410 into a terminal number and transmits it to the communication server 500.

The telematics center database 430 stores user information on the user who receives the telematics service, receives the service subscriber number from the information checker 420, transmits a terminal number corresponding to the subscriber number to the information checker 420, and searches information corresponding to the service subscriber number to store call control request information during traveling and condition notice information during traveling to cover the case in which provision of the service is canceled.

The message receiver 510 of the communication server 500 receives the selection result message from the telematics center 400, and checks the terminal number included in the selection result message to transmit information included in the selection result message to the database 530.

The call connection controller 520 controls call connection between the terminal 300 and a call attempting terminal that attempts to call the driver terminal based on information included in the selection result message, and transmits a message caused by the call connection control to the terminal 300 and the call attempting terminal. The database 530 receives information on the selection result message from the message receiver 510 and stores it.

Regarding the method for controlling the terminal through the above-noted constituent elements, when a vehicle driver takes his vehicle with the terminal 300 and starts running the vehicle, the ECU 100 senses the condition in which the vehicle has started running. The terminal sensor 220 senses the driver terminal 300.

When the information receiver 210 receives information for notifying the condition that the vehicle runs at a speed that is greater than a predetermined speed, for example, 1 km/h, from the ECU 100, and the terminal sensor 220 senses the driver terminal 300, the message generator 230 recognizes it as the condition that the driver is riding in a vehicle with the terminal 300. Therefore, the display 240 transmits a service usage message for asking whether to receive a traveling message for indicating that the driver currently rides in a vehicle and a condition notice service during traveling to the driver through text and voice.

Upon having received the message through the display 240, the driver selects whether to continue to call according to his decision. For example, the decision can include a case in which he selects "Notify the condition and select a call connection control menu" and another case in which he selects "Notify the condition and select call connection permission."

The message generator 230 transmits the result message selected by the driver to the telematics center 400 through the display 240 through the communication connector 250. When the user selects "Do not use the current service," it outputs no message. However, when he selects a menu to notify the condition and control call connection, the message generator 230 transmits a selection menu message to the telematics center 400.

Upon receiving the selection menu message from the terminal control device 200, the information checker 420 of the telematics center 400 refers to the driver terminal information and transmits the condition notice message to the communication server 500 to which the driver terminal 300 is registered by using an IP network. Upon receiving the condition notice message, the call connection controller 520 of the communication server 500 allocates a value of an information field for showing whether to control the call connection or permit it when the corresponding subscriber is riding in a vehicle to a database of the corresponding subscriber.

Under the condition in which the driver drives the vehicle in such state, it is assumed that another user attempts call connection to the driver. The communication server 500 transmits one of the traveling condition notice messages to the call connection attempter according to the value set by the driver.

When "Notify condition and control call connection" is selected, the call outputs a first traveling condition notice message in voice and is then automatically intercepted. The communication server 500 notifies the driver of a call attempt by transmitting a call connection attempt notice message indicating that the call connection attempter made a call connection attempt to the driver, and it also transmits a notice message for indicating that there was a call connection made to the driver to the call connection attempter to control the call connection attempter to perceive the fact that the driver may call the call connection attempter.

When "Notify condition and permit call connection" is selected, the call outputs a second traveling condition notice message in voice and continues to control the call connection requester to make a short call so as to reduce the rate of traffic accidents caused by calling during traveling.

When the driver stops the vehicle and turns off the engine, the terminal control device 200 senses that the driver has stopped the vehicle. The terminal control device 200 transmits a setting cancellation message for canceling condition notice during traveling and a call control setting during traveling because the traveling of the vehicle is stopped to the telematics center 400 through the wireless communication module.

Upon receiving the setting cancellation message, the telematics center 400 transmits the corresponding message to the communication server 500 by using the IP network of the communication system. Upon receiving the setting cancellation message, the communication server 500 cancels the condition notice during traveling and the call control function during traveling from the database of the subscriber because the corresponding subscriber has stopped riding in the vehicle.

The communication server 500 notifies that the condition notice service is canceled while the driver rides in the vehicle by transmitting a cancellation notice message for notifying the subscriber thereof, and notifies the call that is provided by another user that the condition notice service during traveling is inapplicable from now on.

In this instance, the terminal control device 200 detects whether the vehicle has started by receiving information from the ECU 100 of the vehicle or using a GPS module installable in the terminal control device 200. The communication between the terminal control device 200 and the terminal 300 can use the Bluetooth and other techniques.

Also, the method for the communication server 500 to input information for indicating a condition notice during traveling to the database of the subscriber and cancel the same, the method for the communication server 500 to transmit a message to the driver and the call connection attempter, and the method for the communication server 500 to transmit a voice message to the call connection attempter are well known to a person skilled in the art, so no detailed description thereof will be provided in the exemplary embodiment of the present invention.

A method for operating a terminal control device 200 of FIG. 1 will now be described with reference to FIG. 2.

Figure 2:
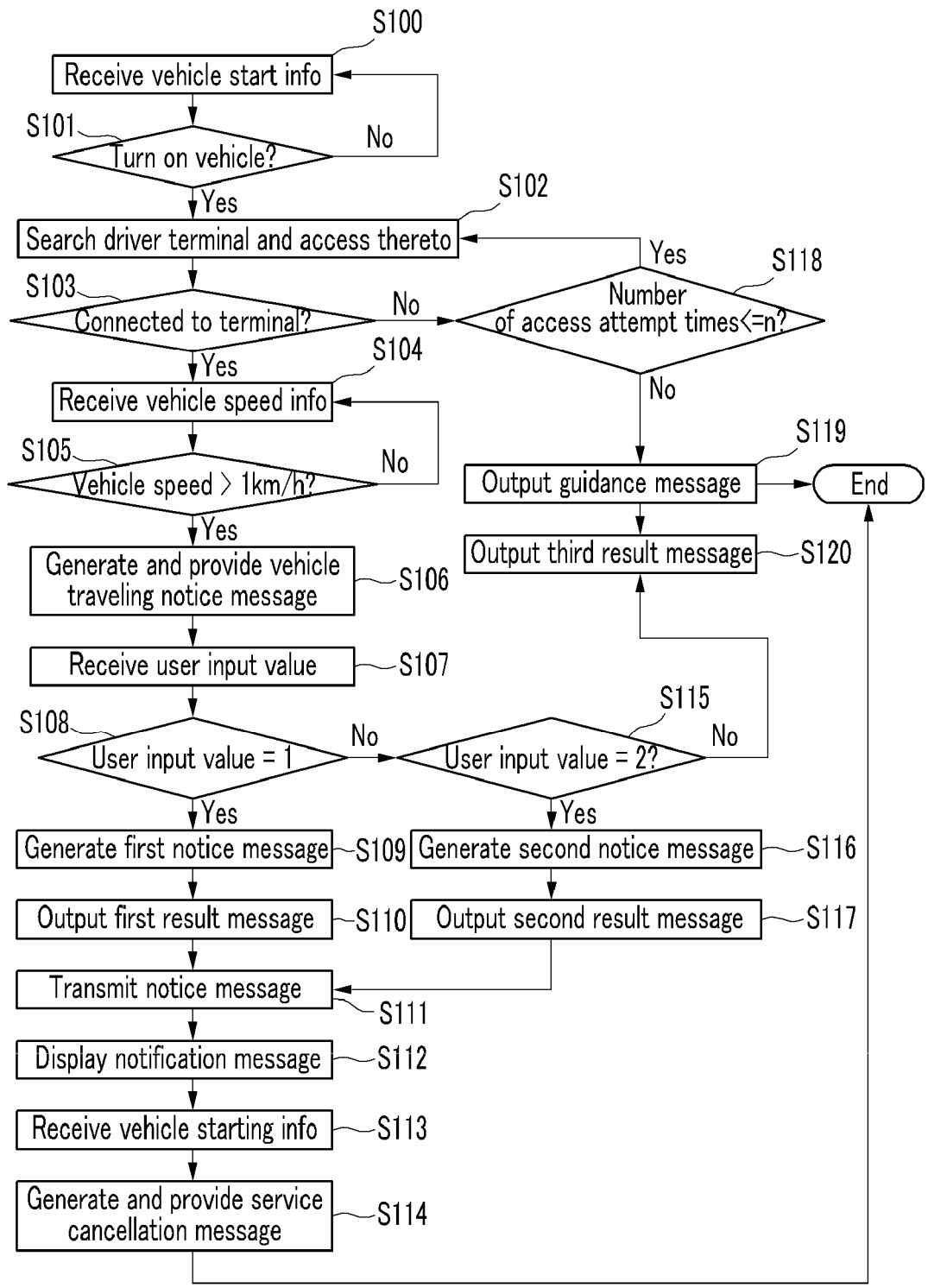
FIG. 2 shows a flowchart of a process for operating a terminal control device according to an exemplary embodiment of the present invention.

FIG. 2 shows a flowchart of a process for operating a terminal control device according to an exemplary embodiment of the present invention.

As shown in FIG. 2, when the driver with the terminal starts the engine of the vehicle and supplies power to the terminal control device 200, the terminal control device 200 performs an algorithm for providing a service. The information receiver 210 receives vehicle starting information from the ECU 100 of the vehicle (S100), and checks whether the engine of the vehicle is turned on or off (S101).

When it is found to be turned on, the terminal sensor 220 attempts to access the driver terminal based on registered driver terminal information (S102). In this instance, the communication method including the Bluetooth can be used to attempt access, and the embodiment is not restricted thereto. The terminal sensor 220 checks whether the terminal sensor 220 is connected to the terminal 300 (S103), and attempts another connection to the terminal, if not connected, a predetermined number of connection attempt times (S118).

At each attempt to access the terminal, the terminal sensor 220 determines whether the attempt exceeds the predetermined number of terminal connection attempt times (S118), and attempts the connection to the driver terminal again if not (S102). However, when it is found to have exceeded the number of times, the terminal control device 200 transmits a guidance message through the display 240 (S119), outputs it in voice, and finishes the corresponding service.

When the terminal sensor 220 is determined to be connected to the terminal 300, the information receiver 210 receives vehicle speed information from the ECU 100 (S104), and determines whether the received speed of the vehicle is greater than a predetermined speed (S105). The predetermined speed will be exemplified as 1 km/h in the exemplary embodiment of the present invention, and it is not restricted thereto.

When the speed of the vehicle is not greater than the predetermined speed that is 1 km/h, it is determined that the engine of the vehicle is turned on but the vehicle is not yet driven and the information receiver 210 returns to the step of S104 to again receive vehicle speed information. However, when it is greater than 1 km/h, the display 240 provides a vehicle traveling notice message for indicating that the vehicle is running together with voice to the driver through the telematics display device (S106). Upon receiving the vehicle traveling notice message, the driver selects whether to use a call service according to the message and voice guidance.

The display 240 checks an input value of a menu that is selected when the driver has read the vehicle traveling notice message and heard the corresponding voice, and transmits the same to the message generator 230. For example, it will be assumed that the driver has selected the first menu, that is, "Notify condition and control call connection" and the user input value for the first menu is 1.

The message generator 230 determines whether the user input value is 1 (S108), and receives the first menu input as the user input value and generates a first notice message (S109) when the user input value is 1. The message generator 230 outputs a text and voice first result message to the display 240 (S110), and transmits the first notice message to the telematics center 400 through the communication connector 250 (S111). Here, the first notice message includes a subscriber telematics service number, call control request state information during traveling, and condition notice information during traveling.

When the user input value is not 1, the message generator 230 determines whether the user input value is 2 (S115). That is, the menu selected by the driver after he has heard the vehicle traveling notice message and the corresponding voice is the second menu that is "Notify condition and permit call connection," the message generator 230 generates a second notice message (S116), transmits a second result message to the driver through the display 240 (S117), and transmits a second notice message to the telematics center through the communication connector 250 (S111).

When the user input value is not 2, that is, when the menu selected by the driver after he has heard the vehicle traveling notice message and the corresponding voice is a third menu, that is, "Do not use the current service," the message generator 230 provides a third result message to the driver through the display 240 (S120).

Also, when the driver does not select the condition recognition notice service during traveling, the message generator 230 can output a guidance message and voice to the display 240 and can forcibly terminate the usage of the terminal in order to lead him to secure driving in control of usage of the terminal (S119). When the driver selects the condition recognition notice service, the message generator 230 can output a notice message through the display 240 in order to lead him to secure driving in control of usage of the terminal (S112).

Having output the notice message in text and voice, the terminal control device 200 stands by until the engine of the vehicle is turned off. That is, when the information receiver 210 receives vehicle starting information for notifying that the engine of the vehicle is turned off from the ECU 100 (S113), the message generator 230 generates a service cancellation message, and terminates the service (S114) by transmitting the generated service cancellation message to the telematics center 400. In this instance, the service cancellation message includes a subscriber telematics service number and condition notice information during traveling.

A service flow will now be described with reference to FIG. 3. The service to be described with reference to FIG. 3 will help understand the service and the related system, and the detailed method for the communication server 500 to transmit a short message or output voice to the call connection requester is well known to a skilled person and will not be described in the exemplary embodiment of the present invention.

Figure 3:
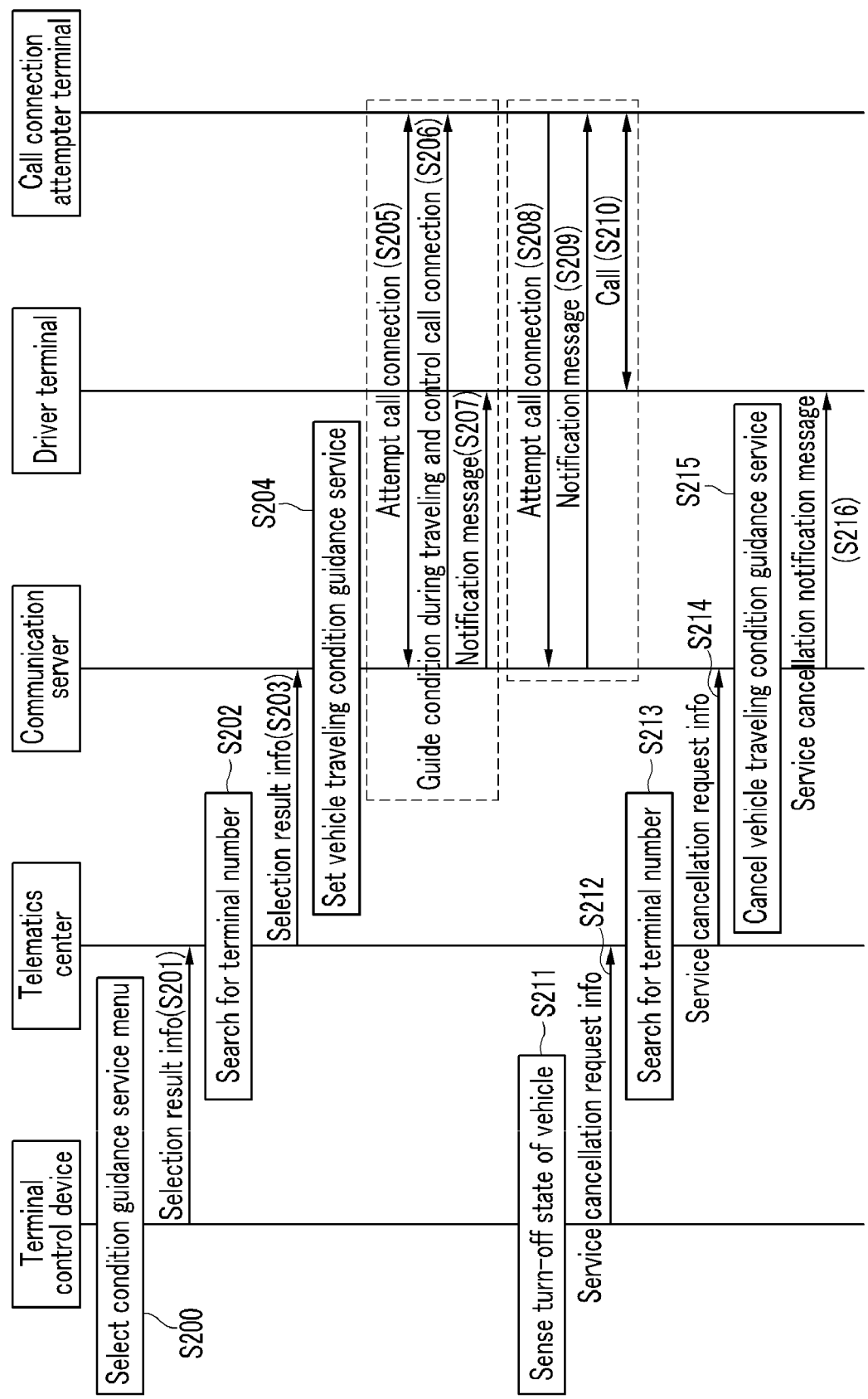
FIG. 3 shows a flowchart of a service according to an exemplary embodiment of the present invention.

FIG. 3 shows a flowchart of a service according to an exemplary embodiment of the present invention.

When the driver has the terminal 300 to take a vehicle and turns on the engine of the vehicle and the terminal control device 200, the terminal control device 200 senses the driver terminal 300 to find the terminal 300 based on stored information, and provides the driver with a message for selecting a condition guidance service during traveling.

When the driver selects a menu of a condition guidance service during traveling (S200), the terminal control device 200 transmits selection result information of the corresponding service to the telematics center 400 (S201). Here, the selection result information includes the driver terminal's service subscriber number, call control request state information, and condition notice state information during traveling.

When the message transmitter/receiver 410 of the telematics center 400 receives the selection result information, the information checker 420 searches a terminal number of the subscriber stored in the telematics center database 430 by using a service subscriber number included in the selection result information (S202), and transmits the selection result information of the condition guidance service menu to the communication server 500 (S203). In this instance, the selection result information includes the terminal number searched in S202 other than the service subscriber number.

When receiving the selection result information, the communication server 500 sets a vehicle traveling condition guidance service for receiving the condition guidance service during traveling based on information included in the selection result information stored in the database 530 (S204). In this instance, the item relating to "Call connection control" from among the options of the "Condition guidance service during traveling" selected by the driver can be classified as "True" and "False".

When the communication server 500 finishes setting the vehicle traveling condition guidance service and a person attempts a call connection to the driver terminal, a process relating to call connection is changed according to the option of "Call connection control."

For example, when the driver sets the "Call connection control" option as "True" and a person attempts call connection to the driver terminal 300 (S205), the communication connection controller 520 transmits a condition guidance voice during traveling for notifying that the terminal owner whom the call connection attempter wants to call is riding in a vehicle and the terminal owner has controlled receipt of calls to the call connection attempter, and then controls the call connection (S206). The communication connection controller 520 having controlled the call connection transmits a message for indicating that the call connection attempter made a call connection attempt to the driver terminal 300 (S207).

When "Call connection control" is set to be "False" and a person attempts a call connection to the driver terminal 300 (S208), the communication server 500 outputs a voice notice message for requesting that the cellular phone owner whom the call connection attempter desires to call is currently driving a vehicle and a call to the cellular phone should be controlled to the call connection attempter (S209), and connects the call between the driver terminal 300 and the call connection attempter terminal S210.

When the driver turns off the engine of the vehicle while the service is performed as described above, the terminal control device 200 senses it (S211). The terminal control device 200 checks whether "Condition notice service during traveling" is selected before the engine of the vehicle is turned off, and transmits service cancellation request information for canceling condition notice service during traveling to the telematics center 400 (S212). In this instance, the service cancellation request information includes the driver's subscriber number and condition notice information during traveling.

Upon receiving the service cancellation request information, the telematics center 400 searches for a terminal number of the subscriber by using a service subscription number of the corresponding telematics service subscriber (S213), and transmits service cancellation request information to the communication server 500 of the corresponding subscriber (S214).

The communication server 500, having received the condition guidance service cancellation information, cancels the condition guidance service cancellation during traveling according to the service cancellation request information from the database of the corresponding subscriber based on the subscriber number (S215). The communication server 500 transmits a service cancellation notice message for indicating that the corresponding service is canceled to the subscriber who is a driver through a short message (S216).

A process for the communication server 500 to set/cancel a condition notice service during traveling from among the services described with reference to FIG. 1 will now be described with reference to FIG. 4.

Figure 4:
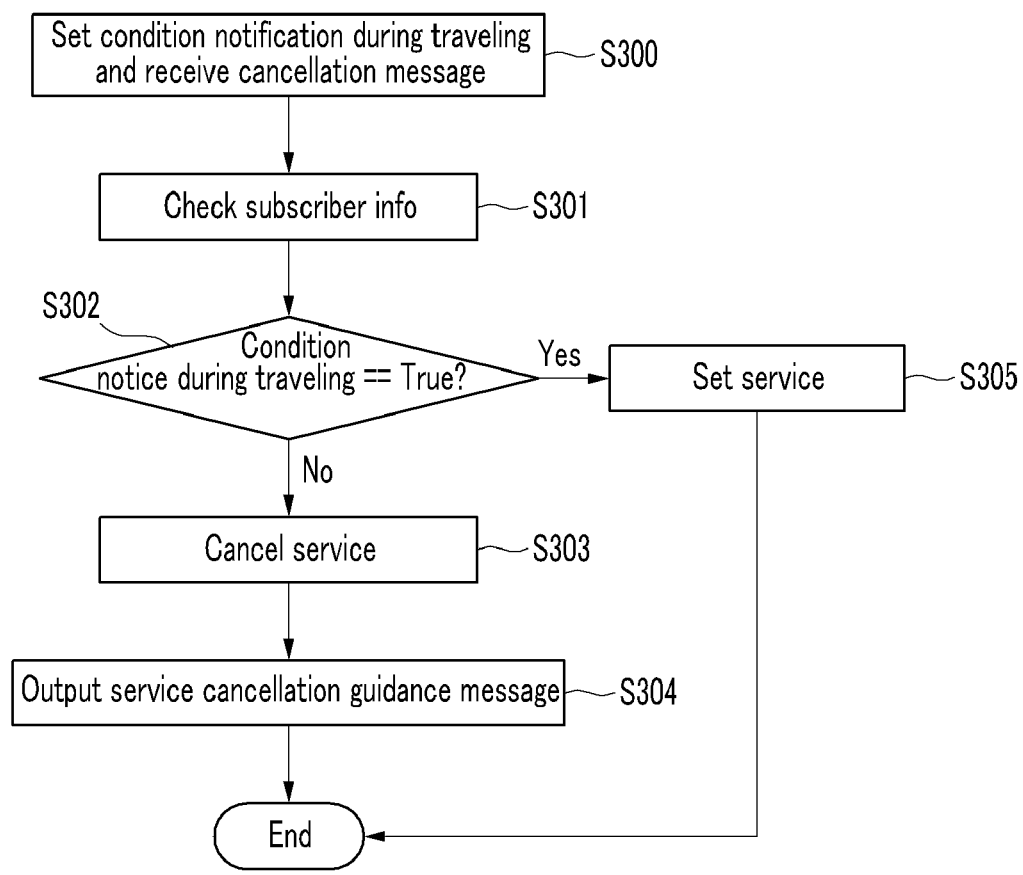
FIG. 4 shows a flowchart for setting/canceling a service according to an exemplary embodiment of the present invention.

FIG. 4 shows a flowchart for setting/canceling a service according to an exemplary embodiment of the present invention.

As shown in FIG. 4, when the communication server 500 receives a message for setting or canceling the condition notice service during traveling from the telematics center 400 (S300), the communication server 500 checks subscriber information (S301). When the subscriber is a subscriber of a mobile communication service provider and has subscribed to the condition notice service during a ride, it is determined whether a received message is a condition notice service setting message during traveling or a condition notice service cancellation message during traveling (S302).

When it is a condition notice service setting message, the service is set (S305). In this instance, services are set in a like manner of "Condition notice during traveling=True" and "Call control during traveling=True/False."

However, when it is found to be a condition notice service cancellation message, the corresponding service is canceled (S303). In this instance, services are canceled in a like manner of "Condition notice during traveling=False" and "Call control during traveling=False."

The communication server 500 generates a service cancellation guidance message and transmits it to the driver terminal 300 so that the corresponding service is canceled from then on (S304). The driver having received the service cancellation guidance message perceives that the corresponding service is canceled from the present time.

An algorithm performed by the communication server 500 when a call connection attempt is made while a condition notice service during traveling is set or canceled by the communication server 500 from among the service scenario described with reference to FIG. 1 will now be described with reference to FIG. 5.

Figure 5:
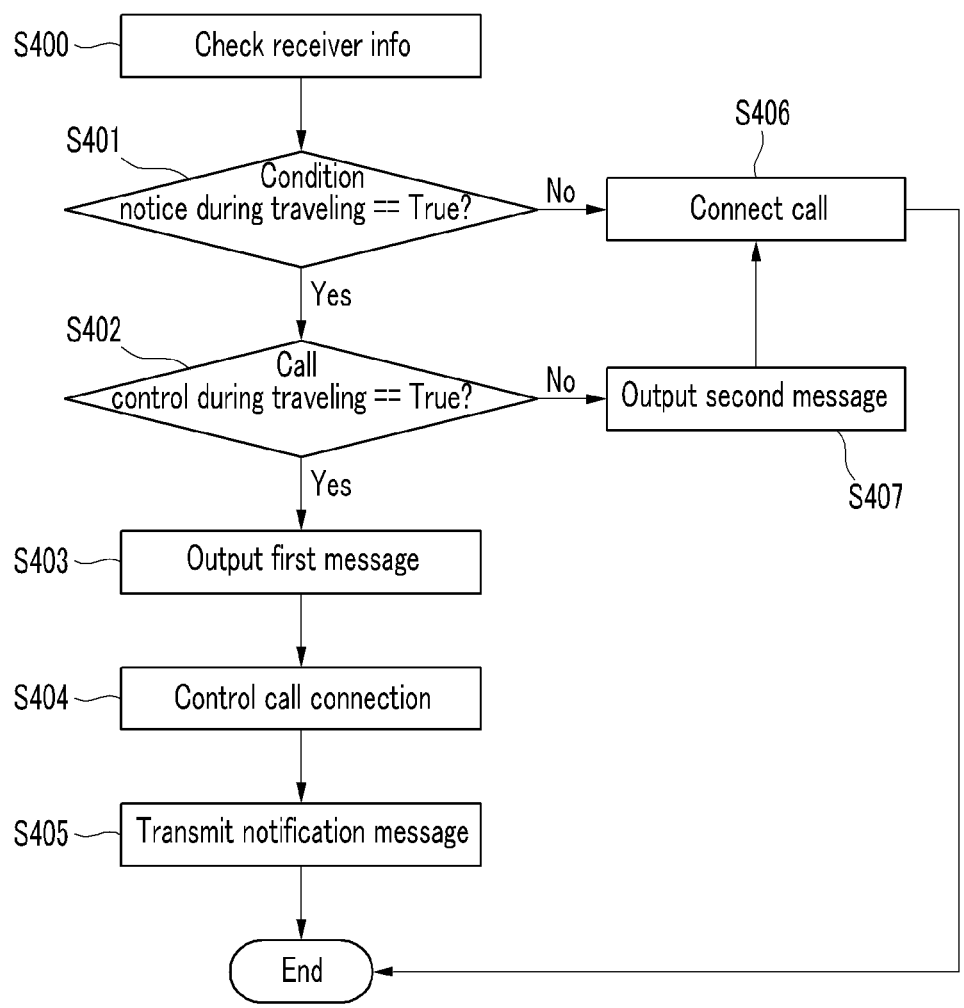
FIG. 5 shows a flowchart when a call connection attempt according to an exemplary embodiment of the present invention is generated.

FIG. 5 shows a flowchart when a call connection attempt according to an exemplary embodiment of the present invention is generated.

As shown in FIG. 5, when a call connection attempter attempts a call connection to the terminal of the driver riding in a vehicle, the communication server 500 checks information of a receiver to check the subscriber and subscription state to the corresponding service (S400), and checks whether the corresponding receiver that is the driver has set the condition notice during traveling (S401).

When the condition notice during traveling is not set (i.e., "False"), the call between the call connection attempter and the terminal of the driver is connected so that the call connection attempter may call the driver (S406). However, when the receiver has set the service for notifying the condition during traveling from the checking result of S401 (i.e., "True"), the communication server 500 determines whether a call control option during traveling is set (S402).

When call control option during traveling is set to be "True", the communication server 500 outputs a first message for notifying in voice that the receiver having requested a call connection is currently riding in a vehicle and has requested to control the terminal call connection during traveling to the call connection attempter (S403), and outputs a voice message for notifying the receiver thereof that the call connection requester has requested a call connection.

The call connection attempter having heard the voice guidance finds that the desired receiver is currently riding in a vehicle. The communication server 500 controls the call of the call connection attempter and finishes it (S404). The communication server 500 transmits a notice message for notifying that there was a call connection attempt to the receiver of the call connection attempter that is the driver (S405). The driver having received the notice message recognizes that there was a call connection attempt.

When the call control option during traveling is set to be "False", a second message for indicating that there may be a danger of a traffic accident if the call connection attempter attempts to call the receiver because the receiver having requested a call connection is currently riding in a vehicle and so the call connection attempter should consider the situation of the driver (S407), and connects the call between the driver and the call connection attempter (S406).

According to an embodiment of the present invention, the rate of traffic accidents caused by calling can be reduced by controlling a call provided to a driver during traveling or controlling a call attempter to control a call by notifying the call attempter thereof that the driver currently drives a vehicle.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for a terminal control device to control a driver terminal according to vehicle drive condition recognition, comprising:
   receiving vehicle speed information from an electronic control unit connected to the terminal control device;
   generating a vehicle traveling notice message based on the received vehicle speed information, and providing the same to the driver terminal;

requesting a telematics center connected to the terminal control device to set a service; and outputting a notice message for notifying that a vehicle traveling condition recognition service is set to the driver terminal, wherein the vehicle traveling condition recognition service notifies a call connection attempting terminal that an owner of the driver terminal is riding in a vehicle and is not receiving a call, and a separate message is sent to the driver terminal to indicate that a call connection attempt has been made in the vehicle traveling condition recognition service.

2. The method of claim 1, wherein
the requesting to set a service includes
outputting one of a first result message for notifying a traveling condition of a vehicle based on an input value that is input corresponding to the vehicle traveling notice message, and notifying a call connection control and a second result message for notifying a traveling condition of a vehicle and connecting a call.

3. The method of claim 2, wherein
the outputting of a result message includes:
determining whether the input value is a first input value;
when it is the first input value, generating a first notice message including call control request information during traveling for notifying a subscriber telematics service number and a call control state during traveling and condition notice information during traveling; and
generating a first result message for the first notice message and outputting the same.

4. The method of claim 3, wherein
the determining of whether the input value is a first input value includes:
when the input value is not the first input value, determining it is a second input value; and
when it is the second input value, generating a second result message for the second notice message and outputting the same.

5. The method of claim 4, wherein
the call control request information during traveling and the condition notice information during traveling are stored as one of "True" or "False".

6. The method of claim 1, wherein
the generating and providing of a vehicle traveling notice message includes:
searching whether a terminal is provided in the vehicle;
attempting to access the terminal when the terminal is provided in the vehicle; and
when the access to the terminal has failed, attempting again to access the terminal within a predetermined number of times until the access to the terminal is successful.

7. The method of claim 1, wherein the method includes, after the outputting of a notice message,
receiving vehicle turn-off information from the electronic control unit, and
transmitting a service cancellation request message to the telematics center,
wherein the service cancellation request message includes a telematics service number and condition notice information during traveling.

8. A method for a communication server in cooperation with a telematics center to control a driver terminal according to traveling condition recognition by a vehicle, comprising:
receiving a result message for condition guidance service selection result information from the telematics center;
storing a driver terminal number, call control request information during traveling, and condition notice information during traveling included in the result message, and setting a condition guidance service for the driver terminal; and
controlling a call connection between a call connection attempting terminal for attempting the call connection to the driver terminal according to a type of the result message and the driver terminal,
wherein the condition guidance service notifies the call connection attempting terminal that an owner of the driver terminal is riding in a vehicle and is not receiving a call, and a separate message is sent to the driver terminal to indicate that a call connection attempt has been made in the condition guidance service.

9. The method of claim 8, wherein
the controlling of call connection includes:
when the result message is a first message, transmitting a guidance message for a call connection control to the call connection attempting terminal; and
transmitting a message for notifying the driver terminal thereof that a call connection is generated.

10. The method of claim 8, wherein
the controlling of call connection includes
when the result message is a second message, transmitting a condition guidance message during traveling to the call connection attempting terminal; and
connecting a call between the driver terminal and the call connection attempting terminal.

11. The method of claim 8, wherein the method includes, after the controlling of call connection,
receiving a service cancellation request message from the telematics center,
canceling the condition guidance service according to the received service cancelation request message, and
transmitting a notice message for cancellation of the condition guidance service to the driver terminal.

12. A device for controlling a driver terminal according to traveling condition recognition by a vehicle in cooperation with a telematics center and a communication server, comprising:
an information receiver, provided in the vehicle, for receiving vehicle information from an electronic control unit for collecting the vehicle information;
a terminal sensor for sensing whether the driver terminal is located in the vehicle and attempting access to the driver terminal when the information receiver receives the vehicle information;
a message generator for generating a condition notice service request message and a traveling message by determining a traveling state of the vehicle based on traveling speed information of the vehicle included in the vehicle information, and generating a selection result message that is a result of the service request message; and
a display for outputting the condition notice service request message and the traveling message generated by the message generator, or transmitting the selection result that is a response to the condition notice service request message to the message generator,
wherein a condition notice service notifies a call connection attempting terminal that an owner of the driver terminal is riding in the vehicle and is not receiving a call, and a separate message is sent to the driver terminal to indicate that a call connection attempt has been made in the condition notice service.

13. The device of claim 12, wherein
the message generator includes a communication connector for transmitting the generated selection result message to the telematics center.

14. A device for controlling a terminal in a communication server for controlling a driver terminal according to traveling condition recognition of a vehicle in cooperation with a telematics center and the terminal control device, comprising:
- a message receiver for receiving a changed selection result message from the telematics server;
- a call connection controller for controlling call connection between the driver terminal and an attempting terminal for attempting call connection to the driver terminal based on information included in the changed selection result message; and
- a database for storing information corresponding to the terminal number included in the changed selection result message,
- wherein the communication server notifies the call connection attempting terminal that a drive terminal owner is riding in a vehicle and is not receiving a call, and a separate message is sent to the drive terminal to indicate that a call connection attempt has been made.

15. The terminal control device of claim 14, wherein the telematics center includes:
- a message transmitter/receiver for receiving the selection result message from the communication connector and transmitting a changed selection result message for the received selection result message to the communication server;
- an information checker for extracting a service subscriber number included in the selection result message received by the message transmitter/receiver, and generating the changed selection result message by inserting a terminal number corresponding to the service subscriber number into the selection result message; and
- a telematics center database for storing information included in the selection result message corresponding to the service subscriber number.

* * * * *